(12) United States Patent
Dote et al.

(10) Patent No.: US 8,458,317 B2
(45) Date of Patent: Jun. 4, 2013

(54) SEPARATING ATTACHMENTS RECEIVED FROM A MOBILE DEVICE

(75) Inventors: Brian Dote, Waipahu, HI (US); Stephane Lunati, Fremont, CA (US); Ken Goto, San Francisco, CA (US); William T. Duffy, San Jose, CA (US); Graham S. Orndorff, Aptos, CA (US); Mankit Sze, Quarry Bay (HK)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/356,141

(22) Filed: Jan. 23, 2012

(65) Prior Publication Data

US 2012/0122426 A1 May 17, 2012

Related U.S. Application Data

(63) Continuation of application No. 11/770,641, filed on Jun. 28, 2007.

(51) Int. Cl.
*G06F 15/173* (2006.01)

(52) U.S. Cl.
USPC .................. 709/223; 709/250; 455/412.1

(58) Field of Classification Search
USPC .............................. 709/250, 223
See application file for complete search history.

(56) References Cited

U.S. PATENT DOCUMENTS

| | | | |
|---|---|---|---|
| 2004/0022444 A1* | 2/2004 | Rhoads | 382/232 |
| 2004/0186894 A1* | 9/2004 | Jhingan et al. | 709/207 |
| 2005/0083413 A1* | 4/2005 | Reed et al. | 348/211.99 |
| 2005/0114459 A1* | 5/2005 | Tu et al. | 709/207 |
| 2006/0265489 A1* | 11/2006 | Moore | 709/223 |

OTHER PUBLICATIONS

U.S. Non-Final Office Action for U.S. Appl. No. 11/770,641 dated Nov. 17, 2010, 28 pages.
U.S. Final Office Action for U.S. Appl. No. 11/770,641 dated Apr. 29, 2011, 38 pages.
U.S. Advisory Action for U.S. Appl. No. 11/770,641 dated Aug. 12, 2011, 3 pages.
U.S. Notice of Allowance for U.S. Appl. No. 11/770,641 dated Oct. 25, 2011, 13 pages.

* cited by examiner

*Primary Examiner* — Wing F Chan
*Assistant Examiner* — Andrew Woo
(74) *Attorney, Agent, or Firm* — Wong, Cabello, Lutsch, Rutherford & Brucculeri, LLP (57) ABSTRACT

A computer-implemented method includes receiving a message from a mobile device over a wireless network, the message including several attachments, wherein the several attachments include one or more mobile device attachments corresponding to content captured using the mobile device, identifying the one or more mobile device attachments; and separating the one or more mobile device attachments from the plurality of attachments.

20 Claims, 7 Drawing Sheets

SEPARATING ATTACHMENTS RECEIVED FROM A MOBILE DEVICE

CROSS-REFERENCE TO RELATED APPLICATION

This application is a continuation (and claims the benefit of priority under 35 U.S.C. §120) of U.S. application Ser. No. 11/770,641, filed Jun. 28, 2007. The disclosure of the prior application is considered part of and is incorporated by reference in its entirety in the disclosure of this application.

TECHNICAL FIELD

This disclosure relates to receiving content, e.g., images, video, and the like, from a mobile device.

BACKGROUND

Mobile devices, such as cellular telephones, can be embedded with several features that enable multiple functions in addition to making and receiving telephone calls. One of the embedded features can include a digital camera to capture digital content including images, video, and the like. The mobile device can also be configured to enable transmission of the captured content from a first mobile device to a second mobile device and/or from a first mobile device to a remote storage device operatively coupled to the first mobile device via wireless means, e.g., over a cellular telephone network, such as a 3G data network. Mobile devices can also be configured to enable the browsing of networks, such as the internet, if the cellular telephone network service provider offers connection to the network. A commonly used network communication feature is sending and receiving messages such as electronic mail messages (e-mails), where an e-mail can contain one or more attachments that represent content. Messages received from mobile devices can include attachments that a user of the mobile device included with the message as well as attachments that were automatically attached, e.g., by the cellular telephone network service provider.

SUMMARY

In one example, a user can capture content, such as a digital image or a snippet of sound, using a mobile device, and transmit the content to a container in a content repository as an attachment to a message, e.g., an e-mail message. In addition to the content captured by the user, other attachments can be included in the message, e.g., an image of a logo of the network service provider, automatically—that is, without active user intervention. The attachments in the message can be scanned to identify the attachment that the user of the mobile device intended to store, e.g., by comparing a size of all attachments in the message with a threshold size. In this manner, the user's digital image can be identified, separated from the attachment, and stored. Further, when a user creates the content repository, e.g., a digital photo album designed to be shared with other users, at a remote location, a unique identifier, can be generated, associated with the content repository, and provided to one or more users including the user who created the repository. Using a mobile device, one or more users can contribute content to the content repository at the network location by transmitting the content as attachments to messages, where the message includes the unique identifier. A mobile device, from which a message is received, can be validated based on the identifier in the message.

In one aspect, a computer-implemented method includes receiving a message from a mobile device over a wireless network, the received message having a plurality of attachments, including one or more mobile device attachments corresponding to content captured using the mobile device, identifying the one or more mobile device attachments, and separating the one or more mobile device attachments from the plurality of attachments.

This, and other aspects, can include one or more of the following features. The method can include validating the mobile device as an acceptable source for receiving the message. The validating can include extracting an identifier from an address included in the message, comparing the extracted identifier with a pre-determined identifier, and deeming the mobile device to be an acceptable source for receiving the message if the extracted identifier matches the pre-determined identifier. The pre-determined identifier can be generated in response to creating a corresponding repository to store the one or more mobile device attachments. The pre-determined identifier can be provided for inclusion in the message. The method can include, based on user input, associating, with the pre-determined identifier, a type of content to be stored in the corresponding repository. The method can further include, upon validating the mobile device, transmitting the message to separate the one or more mobile device attachments. The method can further include storing the separated one or more mobile device attachments in one or more corresponding repositories. The identifying the one or more attachments can include determining metadata associated with a first attachment, comparing the metadata with pre-determined criteria, and upon determining that the metadata satisfies the pre-determined criteria, deeming the first attachment to be one of the mobile device attachments. The metadata can include a first attachment size and at least one of the pre-determined criteria can include a threshold size, and, if the first attachment size is larger than the threshold size, then deeming the first attachment to be one of the mobile device attachments. The metadata can include at least one of a first attachment size, a first attachment name, and a first attachment type. The identifying the one or more attachments can include extracting an identifier from an address included in the message, wherein the identifier includes embedded information corresponding to a type of mobile device attachment, separating the embedded information to determine the type of mobile device attachment, scanning the plurality of attachments to identify the received attachment type, and upon detecting a received attachment type that matches the type of mobile device attachment, deeming the corresponding received attachment as a mobile device attachment. The content captured using the mobile device can include at least one of a digital image, a digital video, a document, and audio. The method can further include storing the separated one or more mobile device attachments in corresponding repositories at a network location, and generating a uniform resource locator (URL) for a corresponding repository, wherein the URL enables accessing the repositories from a remote network location.

In another aspect, a medium bearing instructions to enable one or more machines to perform operations is described. The operations include receiving a message from a mobile device over a wireless network, the received message having a plurality of attachments, including one or more mobile device attachments corresponding to content captured using the mobile device, identifying the one or more mobile device attachments, and separating the one or more mobile device attachments from the plurality of attachments.

This, and other aspects, can include one or more of the following features. The operations can include validating the mobile device as an acceptable source for receiving the message. The validating can include extracting an identifier from an address included in the message, comparing the extracted identifier with a pre-determined identifier, and deeming the mobile device to be an acceptable source for receiving the message if the extracted identifier matches the pre-determined identifier. The pre-determined identifier can be generated in response to creating a corresponding repository to store the one or more mobile device attachments. The pre-determined identifier can be provided for inclusion in the message. The operations can include, based on user input, associating, with the pre-determined identifier, a type of content to be stored in the corresponding repository. The operations can further include, upon validating the mobile device, transmitting the message to separate the one or more mobile device attachments. The operations can further include storing the separated one or more mobile device attachments in one or more corresponding repositories. The identifying the one or more attachments can include determining metadata associated with a first attachment, comparing the metadata with pre-determined criteria, and upon determining that the metadata satisfies the pre-determined criteria, deeming the first attachment to be one of the mobile device attachments. The metadata can include a first attachment size and at least one of the pre-determined criteria can include a threshold size, and, if the first attachment size is larger than the threshold size, then deeming the first attachment to be one of the mobile device attachments. The metadata can include at least one of a first attachment size, a first attachment name, and a first attachment type. The identifying the one or more attachments can include extracting an identifier from an address included in the message, wherein the identifier includes embedded information corresponding to a type of mobile device attachment, separating the embedded information to determine the type of mobile device attachment, scanning the plurality of attachments to identify the received attachment type, and upon detecting a received attachment type that matches the type of mobile device attachment, deeming the corresponding received attachment as a mobile device attachment. The content captured using the mobile device can include at least one of a digital image, a digital video, a document, and audio. The operations can further include storing the separated one or more mobile device attachments in corresponding repositories at a network location, and generating a uniform resource locator (URL) for a corresponding repository, wherein the URL enables accessing the repositories from a remote network location.

The systems and techniques presented here can provide one or more of the following advantages. Separating attachments received from a mobile device from among multiple attachments can enable storing only the content that a user intended to be stored in a content repository. Validating a mobile device from which content is received can help ensure that only those sources (e.g., other users) that a creator of a content repository has approved can access the content in the repository. Further, generating a unique identifier for each container can facilitate routing the content to the corresponding identifier. Also, generating a unique identifier and providing the identifier to a user can facilitate sharing the content of the repository.

Details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
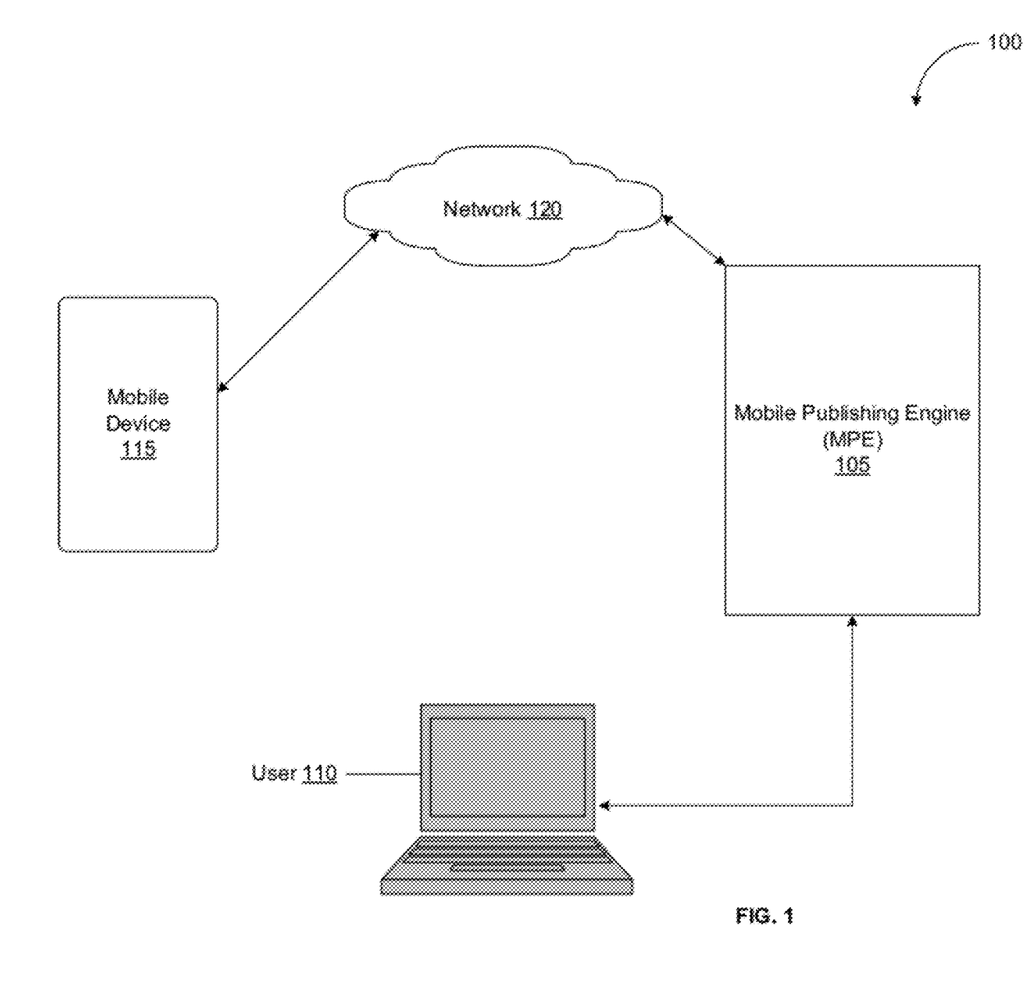
FIG. 1 shows an example of a system for receiving content from a mobile device.

FIG. 1 depicts a schematic of an example of a system 100 for receiving content from a mobile device. The system can include a mobile publishing engine (MPE) 105 to which a user 110 and a mobile device 115 can be connected. The user 110 can interact with the MPE 105 using virtually any instrument such as a desktop computer, a laptop computer, a personal digital assistant (PDA), and the like, via protocols such as the Transmission Control Protocol/Internet Protocol (TCP/IP). The mobile device 115 can be any instrument such as a cellular telephone, a digital camera, a digital camcorder, and the like, including devices that combine one or more of these functions, that can be wirelessly connected to the MPE 105. The mobile device 115 can be connected to the MPE 105 through a wireless network 120, such as a cellular telephone network. In some implementations, the mobile device 115 and the MPE 105 can exchange messages via protocols such as Simple Mail Transfer Protocol (SMTP). For example, the mobile device 115 can send content to the MPE 105 as attachments to e-mails, e.g., in the multipurpose internet mail extensions (MIME) format. Alternatively, and in addition, the mobile device 115 and the user 110 can interact with the MPE 105 via any other protocol.

In some implementations, the user 110 can create a repository in the MPE 105, in which the user 110 can store content. The content can include one or more of digital images, digital video, audio, documents, and virtually any type of content. The user 110 can enable the repository to be accessed by devices including the mobile device 115. When the user 110 creates a repository in the MPE 105, the MPE 105 can generate and associate a unique identifier to the repository and provide the unique identifier to the user 110. The user 110 can use the mobile device 115 to send content to be stored in the content repository. For example, the mobile device 115 can include digital image capture features that the user can use to take photographs. In some implementations, the mobile device 115 can be configured to generate an e-mail message to which the content can be attached. The user can send the e-mail message to the MPE 105 over the network 120. The e-mail message can contain information that the MPE 105 can use to determine that the source of the e-mail message is authorized to deposit content in the repository. Upon validating the source of the e-mail message, the MPE 105 can scan the message, identify the content that the user attached to the message, discard other material in the message in addition to the content, and then store the content in the repository. The e-mail message containing content can be received from a mobile device operated by the user 110 who created the repository in the MPE 105 or from a different user 110 in possession of the unique identifier that enables accessing the repository in the MPE 105. The content stored in the repository can be viewed by users 110, including the user who created the repository and other users, using one or more mobile devices 115 and/or any suitable instruments, such as desktop computers, laptop computers, PDAs, and the like.

Figure 2:
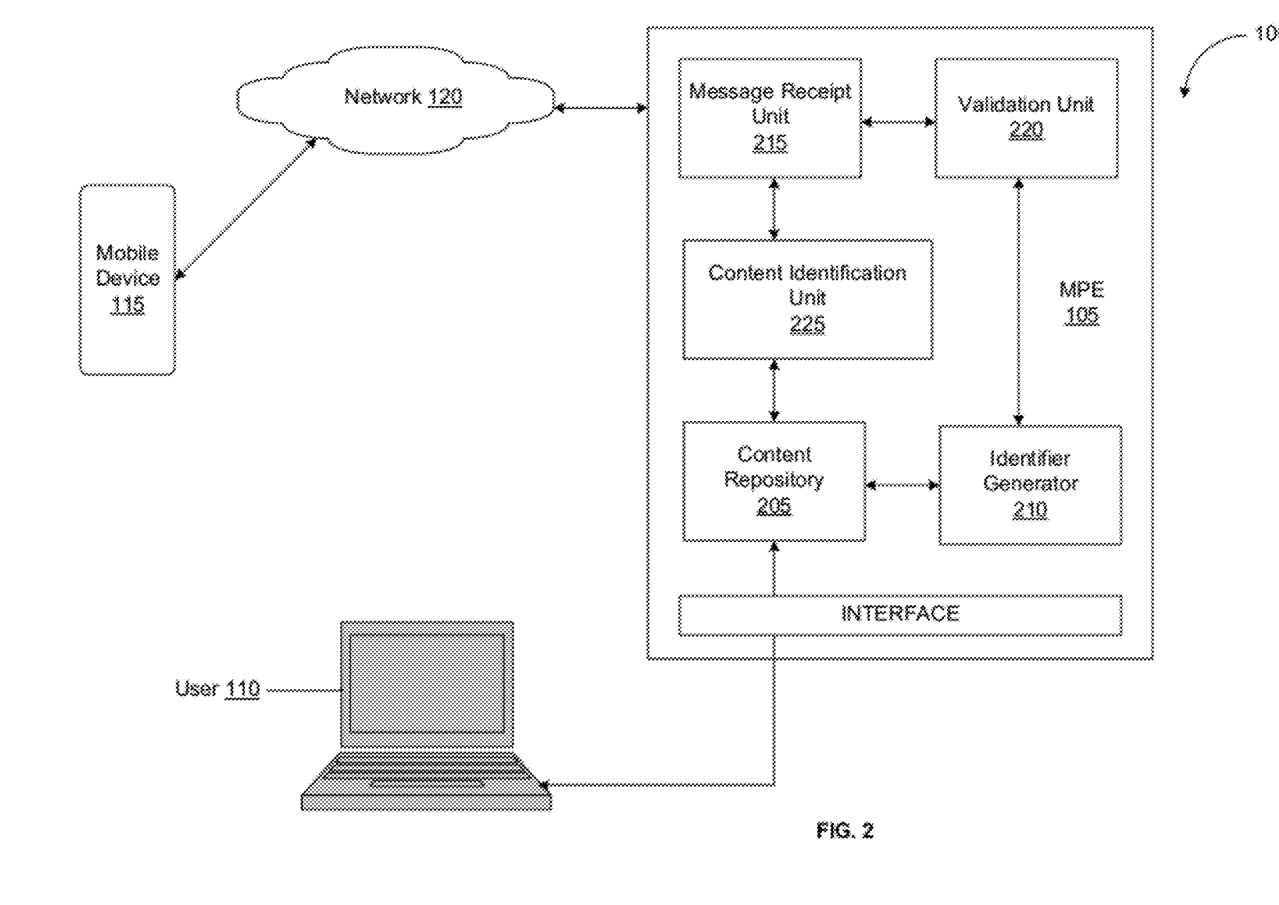
FIG. 2 shows an example of an engine for receiving content from a mobile device.

FIG. 2 depicts a schematic of an example of a system 100 including an MPE 105 connected to a user 110 and to a mobile device 115 over a network 120. The MPE 105 can enable one or more users to interact with the MPE 105 via an interface. For example, the MPE 105 can present the user with a network location, e.g., a website, that can be identified by a uniform resource locator (URL), which the user can enter into a web browser, e.g., Safari. The network location can be configured to enable new users to create accounts and existing users to access previously created accounts. In some implementations, the user 110 may have previously created an online account on the MPE 105. The MPE 105 can include storage space, a portion of which the MPE 105 can allocate to the user 110 for use as a content repository 205. When the user creates a content repository 205, the MPE 105 can identify the content repository 205 by a unique user name.

For example, when the user 110 creates an account on the MPE 105, the MPE 105 can assign a unique user name and allow the user to create a content repository 205. The content repository 205, identified by the user name, can include one or more containers that represent, e.g., photograph albums to which the user 110 can send one or more images. In some implementations, in response to user 110 input, the MPE 105 can create the one or more containers and assign an identifier to each container using the identifier generator 210. The identifier generator can create and assign, for each container, e.g., a PIN number, an e-mail address based on the user name, a combination of the PIN, the user name, and the e-mail address, and the like. For example, the MPE 105 can assign "User" as a user name, and create an e-mail address "user@mpe.com" that the user can use to transmit content to the content repository 205 on the MPE 105. When the MPE 105 receives input from the user to create, e.g., 3 containers in the content repository 205, the identifier generator 210 can be configured to generate and the MPE 105 can be configured to assign identifiers "1," "2," and "3" for each container. Thus, containers 1, 2, and 3 in the content repository 205 can be accessed using corresponding identifiers "user1," "user2," and "user3," respectively.

Further, the MPE 105 can be configured to enable the user 110 to transmit content to specific containers in the content repository 205 from a location operatively coupled to the MPE 105. In some implementations, the MPE 105 can provide the unique identifier for each container to the user 110. The MPE 105 can be configured to receive messages, e.g., e-mail messages, from the user 110, where an e-mail message includes content, e.g., as an e-mail attachment, and where the destination for the attached content is one of the containers in the content repository 205. For example, to send content to a container 1 in the content repository 205, the user 110 can generate an e-mail message, attach the content, and transmit the e-mail message to "user1@mpe.com." In some implementations, based on the e-mail address, the MPE 105 can be configured to identify the source of the e-mail message and the container in the content repository 205 which is the intended destination of the content attached to the e-mail message. In the above example, by scanning the e-mail message address "user1@mpe.com," the MPE 105 can be configured to identify that the received e-mail message was sent to the account of a user 110 having the user name "user," and that the destination of the e-mail message is container "1". Since an account for the user 110 was previously created, and since a unique identifier "1" for a container was previously generated, the MPE 105 can be configured to store the content in container 1 in the content repository 205 corresponding to the user's account. In some implementations, the MPE 105 can create and store a table including source e-mail addresses and corresponding attachment destinations. When a message including an attachment is received from a source, the MPE 105 can scan the source address and identify the corresponding destination using the stored table.

In some implementations, the user 110 can transmit a message from a computer operatively coupled to the MPE 105. In other implementations, the user 110 can transmit a message including content from the mobile device 115. For example, the mobile device 115 can include digital image capture features with which the user 110 can capture a digital image. In addition, the mobile device 115 can be configured to transmit e-mail messages over the network 120 to the MPE 105. The mobile device 115 can be configured to include attachments to the e-mail messages, where the attachments can be the digital images captured using the mobile device 115 and/or virtually any other type of content that can be captured, stored, or both, using the mobile device 115.

The MPE 105 can include a message receipt unit (MRU) 215 which can be configured to receive an e-mail message, including an attachment, from the mobile device 115. In addition, the MPE 105 can include a validation unit 220 that can be configured to determine if the source from which the e-mail message with the attachment was received is authorized to access the content repository 205. For example, a table including user names, corresponding content repositories, containers in each content repository, and identifiers for each container can be created and stored in the identifier generator 210. In some implementations, when a container is created, the identifier generator 210 can create the unique identifier and associate the identifier to the container. In other implementations, a table of identifiers can be previously created. As and when a user creates a container, an identifier from the table can be associated with the container. The validation unit 220 can be configured to extract the e-mail address from the e-mail message and identify the unique identifier. Alternatively, the MRU 215 can be configured to extract the identifier from the e-mail message and transmit the identifier to the validation unit 220. The validation unit 220 can further be configured to scan the table of identifiers in the identifier generator 210 to determine if the identifier matches a container in the content repository 205. If the identifier matches a container, the validation unit 220 can be configured to instruct the MRU 215 to transmit the entire e-mail message with the attached content to the content identification unit (CIU) 225.

The CIU 225 can be configured to identify the attached content from the e-mail message received from the mobile device 115. For example, the mobile device 115 can be a cellular telephone including a digital camera. The user, having captured an image using the telephone, can transmit the image to the MPE 105 over the network 120, e.g., a cellular telephone network. The cellular telephone network service can be provided by an external service provider that enables e-mail transfer between the mobile device 115 and the MPE 105. When the user 110 transmits an e-mail message including an attachment over the network provided by the network service provider, the provider may embed one or more items of content in the message in addition to the user's attachment. For example, the network service provider may include an image of a company logo, an advertisement image, and the like, as default attachments to the e-mail message. When a receiver of an e-mail message from the mobile device 115 views the message, the receiver can see both the attachments, e.g., the digital images that the user of the mobile device 115 captured, as well as any default attachment to the e-mail message, e.g., included by the network service provider. The CIU 225 can be configured to detect the attachment that the user 110 of the mobile device 115 intended to store in a container in the content repository 205 and disregard all other attachments to the e-mail message.

The MRU 215 can transmit the e-mail message, containing more than one attachment, including the attachment received from the user 110 of the mobile device 115, to the CIU 225. The CIU 225 can be configured to determine the attachment by detecting the format of all the attachments in the e-mail message. For example, if the attachment sent from the mobile device 115 is a video file, then the format of the file, e.g., .mov, can be determined by scanning the file extension of the attachment. All other attachments can be picture files having file extensions such as .jpg, .gif, .tif, .bmp, and the like. The CIU 225 can be configured to determine that since one of the files is a video file, while all other files are image files, the video file is the attachment received from the mobile device 115. In this manner, the CIU 225 can be configured to differentiate between image file attachments and other file type attachments, e.g., documents, and the like, to identify the attachment received from the mobile device 115.

In some implementations, the attachment from the mobile device 115 can be an image file. The CIU 225 can be configured to identify the mobile device 115 attachment based on one or more factors including, e.g., the attachment name, the size of the attachment, the network service provider, and the like. For example, the size of the attachment from the mobile device 115 can be larger than those of the attachments from, e.g., the network service provider. The CIU 225 can scan all the attachments in an e-mail message, determine the size of each attachment, e.g., based on attachment metadata, and, identify the one or more attachments that are larger in size than a threshold size. The MPE 105 can disregard all attachments smaller than the threshold size and can transfer the attachments larger than the threshold size to the content repository 205 for storage in the corresponding container. In some implementations, the CIU 225 can identify the mobile device 115 attachment based on the history of messages received. For example, a network service provider can attach a fixed number of attachments to each message. The CIU 225 can track messages transmitted by the network service provider to identify the fixed number of provider attachments. Upon tracking several messages from the same provider, the CIU 225 can be configured to identify the fixed number of messages that the provider attaches based on, e.g., the file name, file type, the file size, and the like. For example, the provider can always include attachments titled "Provider1.jpg," "Provider2.jpg," and "Provider3.jpg," which can always be, e.g., 7 KB, 6 KB, and 13 KB, in size respectively. The CIU 225 can track each message and, subsequent to tracking a number of messages transmitted by the same provider, identify and disregard the provider attachments. In some implementations, when the user 110 of a mobile device 115 captures a digital image using the mobile device 115, the mobile device 115 can store the captured image under a default name, e.g., "Image001." Subsequent images can be stored as "Image002," "Image003," and so on. When the stored images are attached to e-mail messages and sent to the MPE 105, the CIU 225 can be configured to scan the names of the files, identify that the names correspond to default names under which captured images are stored, and further identify that all attachments with default names were received from the mobile device 115. In some implementations, the criteria for identifying attachments can be received from a user. Subsequently, the MPE 105 can transmit the identified attachments to the content repository 205 for storage in corresponding containers. In some implementations, the CRU 225 can be configured to identify that the attachment from the mobile device 115 is of one file type, e.g., JPEG, while attachments that are not from the mobile device 115 are of another file type, e.g., GIF. The CRU 225 can further be configured to disregard all attachments that do not match the file type of that received from the mobile device 115. In some implementations, the MPE 105 can be configured to inspect information included in the message, e.g., content-type header, to determine the type of attachment. In implementations where the attachment is identified to be a video file, the MPE 105 can be configured to further scan the first few bytes of the attachment to further identify the type of movie file, e.g., AVI, MPEG, and the like.

Figure 3A:
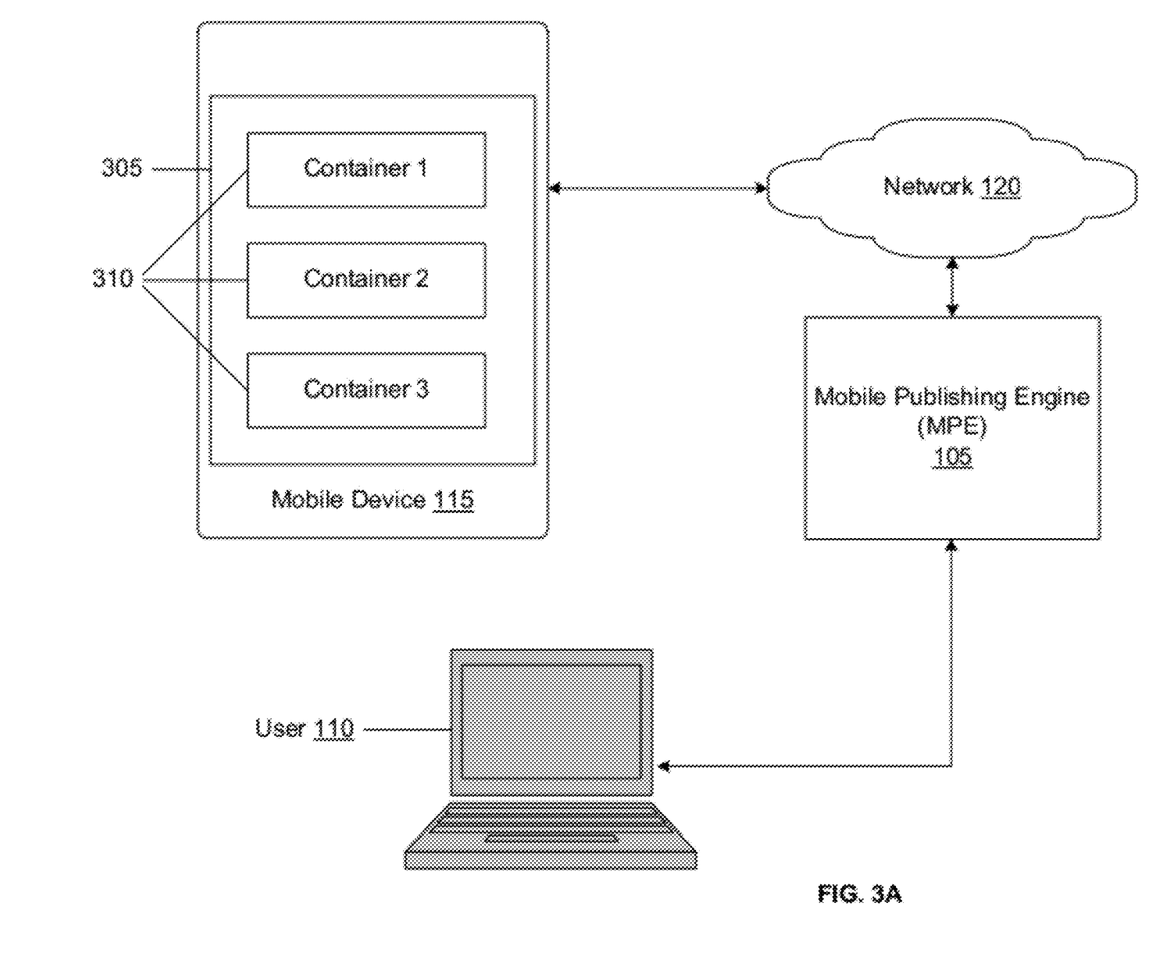
FIG. 3A shows an example of an interface on a mobile device for transmitting content.

FIG. 3A depicts a schematic of a user interface (UI) 305 on the mobile device 115 to enable a user to access containers in the content repository 205 on the MPE 105. In some implementations, the mobile device 115 can include a UI 305 to enable the user 110 to interact with the mobile device 115 to perform one or more functions including creating an e-mail message for transmission. In some implementations, all content created by a user in the content repository 205 can be accessed from the mobile device 115. In other implementations, the user 115 can enable mobile device access of one or more containers and disable access of other containers in the content repository 205. When the user accesses the content repository 205 from the mobile device 115, all containers 310 enabled for access can be displayed in the UI 305, e.g., as one or more poster frames. In some implementations, when the user 110 creates an account on the MPE 105, the user 110 can synchronize the mobile device 115 with the MPE 105 such that the MPE 105 can recognize transmissions from the synchronized mobile device 115. In such implementations, when the MPE 105 receives a request to view the enabled containers 310 in the content repository 205 from the synchronized mobile device 115, the MPE 105 can transmit the contents of the containers 310 to the synchronized mobile device 115 for display in the UI 305. In other implementations, when the MPE 105 receives a request for content from a mobile device 115, the MPE 105 can request validation information from the mobile device 115. For example, the request transmitted to the mobile device 115 from the MPE 105 can be displayed as a log-in screen on the UI. A user 110 of the mobile device 115 can enter a user name and a password, that the MPE 105 can authenticate, before displaying enabled containers 310 on the UI 305 of the mobile device 115. In some implementations, the UI 305 can be configured to display a list of users that can share one or more containers, in addition to displaying the containers. In some implementations, the UI 305 can be configured to enable creating a new container for storage in the content repository 205, and transmitting messages including attachments, where the attachments are meant for storage in the new container.

The user 110 can interact with the mobile device 115 using a pointing device such as a stylus, the user's finger, and the like. Alternatively, or in addition, the mobile device 115 can include a near-touch screen where the mobile device 115 can detect the presence of a pointer, e.g., the user's finger, based on infrared (IR) radiation emitted from the pointer, without the pointer making contact with the mobile device 115. For example, when the user 110 accesses a container 310 displayed on the UI 305, one or more objects, such as images, stored in the container 310 can be displayed as poster frames in the UI 305. In addition, the UI 305 can be configured to display navigation buttons that can enable a user 110 to access the one or more containers 310 and the contents of each container 310 displayed on the UI 305. In implementations where the mobile device 115 has been synchronized with the MPE 105 by the user 110, in response to a user 110 capturing a digital image, the mobile device 115 can be configured to generate a message, include the captured message as an attachment to the message, and, upon receiving input from the user 110, transmitting the message with the attachment to the MPE 105 for storage in the container 310 that the user has accessed using the mobile device 115.

Figure 3B:
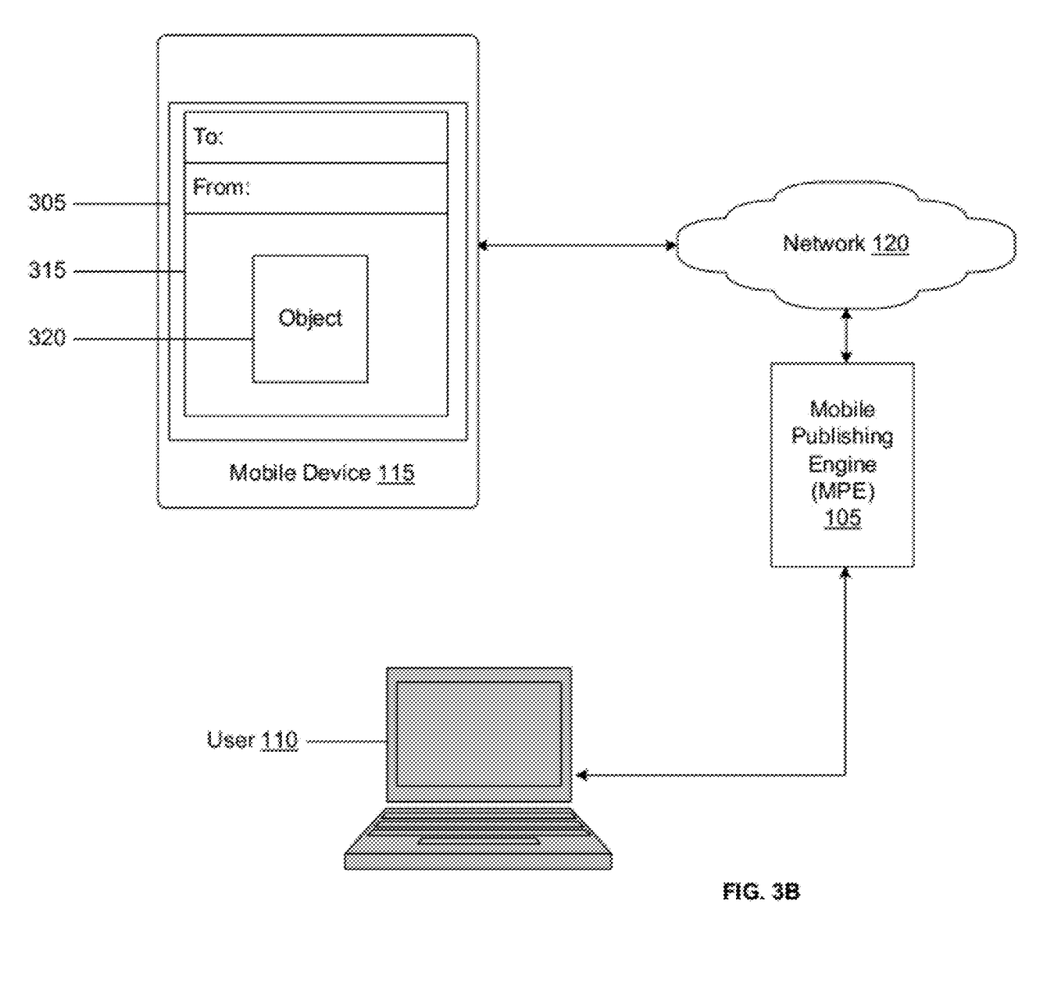
FIG. 3B shows an example of an interface on a mobile device for transmitting content.

FIG. 3B is an example of a UI 305 on a mobile device 115 with which the user 110 can interact to transmit messages including attachments over the network 120 to the MPE 105. The user 110, having created and enabled a container 310 in the content repository 205, can access the container to view and edit the contents on the UI 305. In addition, the user 110 can transmit messages including attachments, such as digital images, where the attachments can be stored in the enabled container 310. After the user 110 accesses one of the enabled containers 310, the user 110 can capture an image using the digital image capture features of the mobile device 115. The mobile device 115 can be configured to provide the user 110 with a feature, e.g., a selectable button on the UI 305, that the user can select to generate a body of a message 315 to which the captured image can be attached as an object 320. Since the mobile device 115 has already been synchronized with the MPE 105, the mobile device 115 can be configured to generate the message to be transmitted to the address generated by the MPE 105, without requiring the user to generate the message or remember the address. Further, when the MPE 105 receives the message generated by the mobile device 115, the synchronization of the MPE 105 and the mobile device 115 can enable the MPE 105 to recognize that the message is from a valid source, namely, the synchronized mobile device 115. In some implementations, the user 110 can capture one digital image at a time, and the mobile device 115 can generate a message for each captured image. Alternatively, or in addition, the mobile device 115 can be configured to receive several images captured by the user 110 and transmit all the captured images as multiple attachments to the same message.

Figure 4:
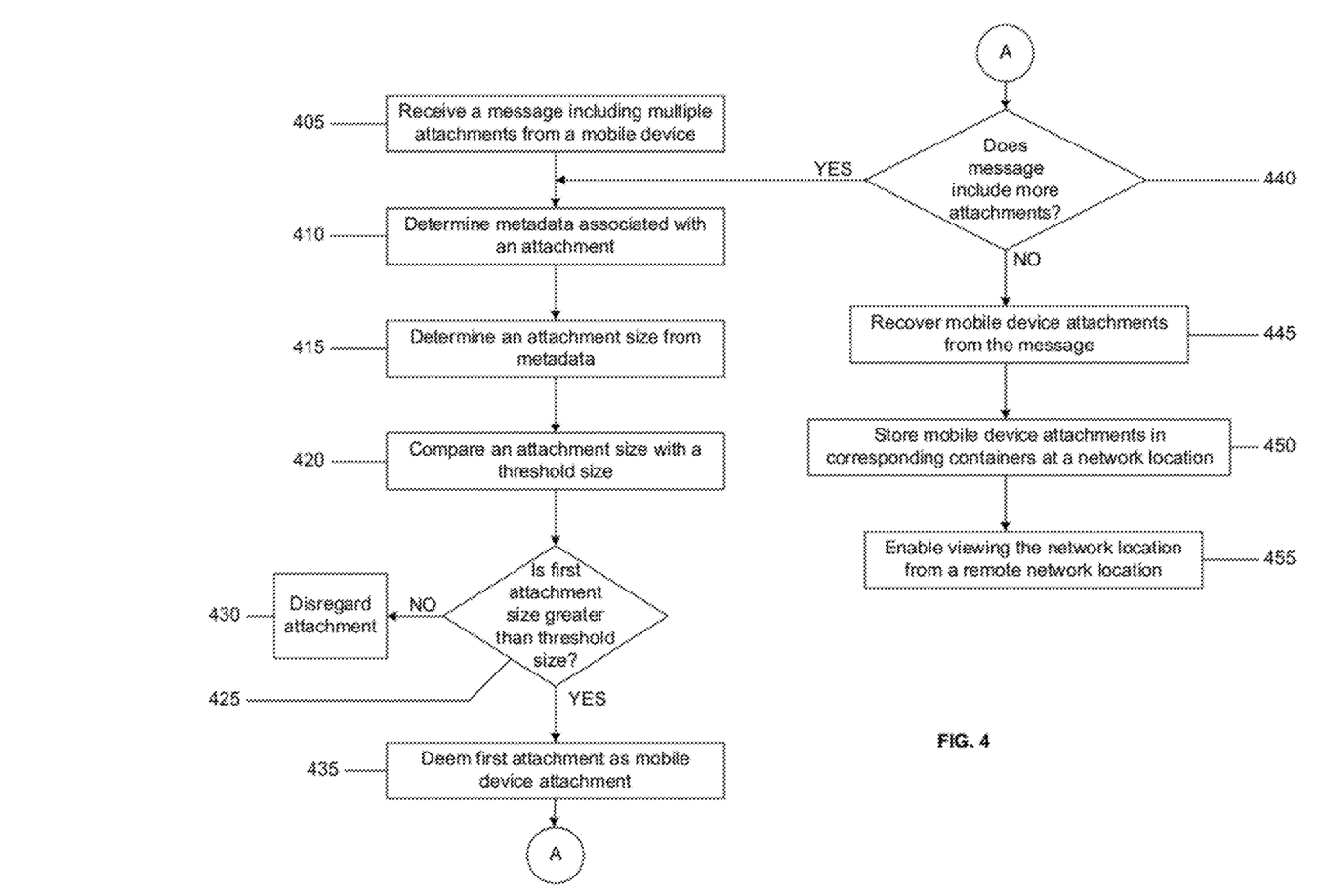
FIG. 4 is a flow chart of an example of a process for separating attachments from a message received from a portable device.

FIG. 4 depicts a flow chart of an example of a process for separating attachments from a message received from a mobile device. The message, including multiple attachments, can be received from the mobile device at 405. One or more of the multiple attachments can be mobile device attachments that a user captured using the mobile device and, therefore, intended to include as attachments to the message. Other attachments to the message can be received from, e.g., the network service provider that enables transmission of the message from the mobile device to the MPE. Metadata associated with an attachment can be determined at 410. The metadata can be included in the message or can be embedded in the attachment by the mobile device. The metadata can include information about the attachment, such as, attachment name, size, type, time of capture, and the like.

The size of the attachment can be determined, based on the received metadata, at 415. In some implementations, the size of the mobile device attachment can be larger than the sizes of all other attachments to the message. For example, if the attachments, other than the mobile device attachments, are included in the message by the network service provider, then such attachments may represent service provider logos, advertisements, and the like. It can be expected that such attachments are not large in size (e.g., in KB), so as to decrease storage space occupied by such attachments, maximize storage space of attachments received from a user, and thereby provide a better user experience. A threshold size of such attachments can be assigned, determined based on the multiple attachments in the received message, or both. The size of an attachment in the message can be compared with the threshold size at 420 to check if the attachment size is greater than the threshold size at 425. If the attachment size is not greater than the threshold size, then it can be determined that the attachment is not the mobile device attachment, and the attachment can be disregarded at 430. Alternatively, if it is determined that the attachment is greater in size than the threshold size, the attachment can be deemed to be a mobile device attachment at 435. In this manner, a mobile device attachment can be determined. A user can transmit more than one attachment in the same message. A check can be performed to determine if the received message includes more attachments at 440. If the message includes more attachments, then the processes of obtaining metadata for an attachment (410), determining attachment size from metadata (415), comparing attachment size with the threshold size (420), and disregarding (430) or deeming as mobile device attachment (435) can be repeated for each attachment. Once all the mobile device attachments in a message are identified, the mobile device attachments can be separated from the message at 445. In some implementations, the content-type header provided for each attachment can be inspected to identify an attachment. In addition, a template system corresponding to the template system offered by most network service providers can be generated. The generated template system can be compared against the received message to identify attachments that do not match the template. Such attachments can be identified as attachments received from a user. In addition, attachment detection can be done based on the mail signature of the message, the internet protocol (IP) address used for receiving the message, and the like. In other implementations, the processes of determining if attachments are mobile device attachments can be done in parallel for all attachments. In some implementations, the separated mobile device attachments can be stored in corresponding containers at 450. The containers can be located at a network location and a URL representing each container as well as URLs representing each attachment can be generated. The generated URLs can be provided to one or more users at one or more remote network locations to enable viewing the attachments on the network location at 455. The remote network location can be the same mobile device as the one from which the message with attachments was received, a different mobile device, a computer connected to the network, and the like.

Figure 5:
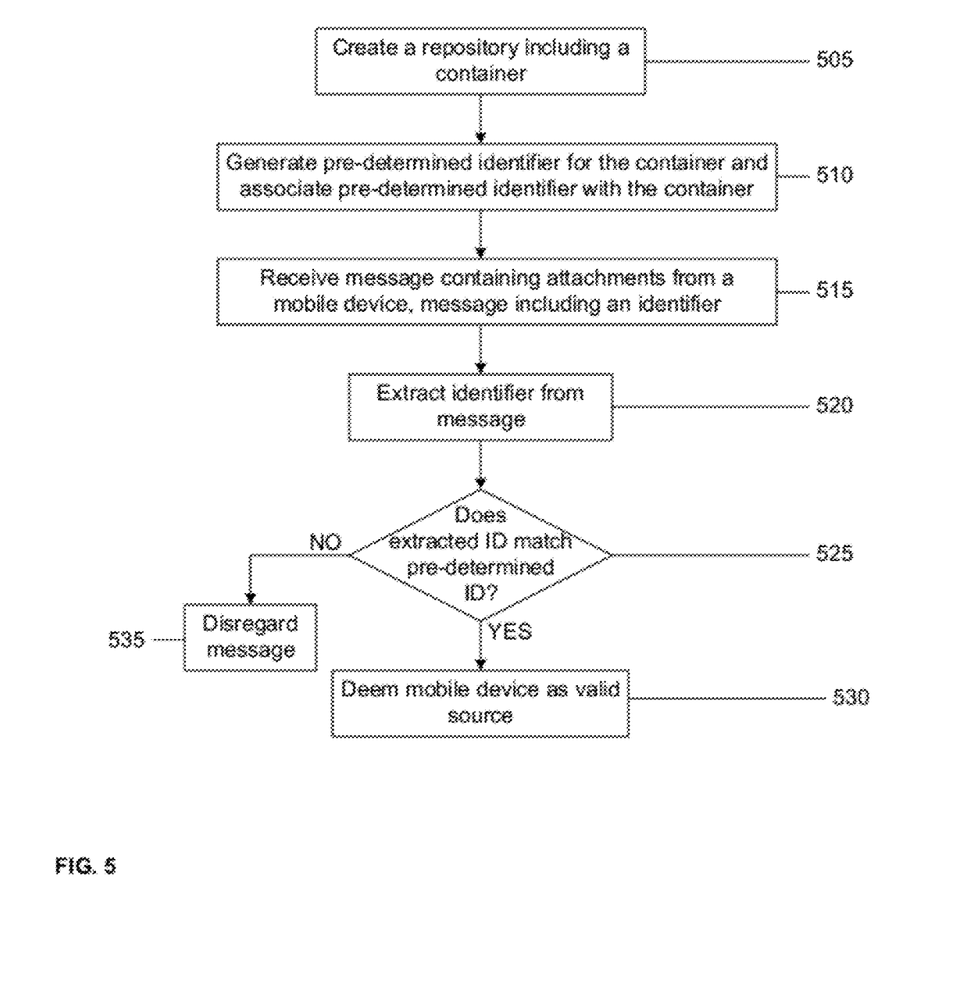
FIG. 5 is a flow chart of an example of a process for validating the mobile device from which a message with attachments is received.

FIG. 5 depicts a flow chart of an example of a process for validating the mobile device from which a message including attachments is received. In some implementations, a user of the mobile device can create a repository at a network location at 505, where the repository can include one or more containers. The user can enable one or more containers in the repository to receive and store content transmitted to the container by the user and by other members with whom the user wishes to share the contents of the container. In response to the creation of a repository with containers, a pre-determined identifier can be generated for each container and associated with the container. The pre-determined identifier can be a PIN number including numbers, letters, alphanumeric characters, and combinations of the same, an e-mail address for the user, combinations of the e-mail address and the PIN number, or virtually any other type of identifier. In this manner, each container in a repository corresponding to a user can be identified by a unique identifier. In addition to associating the pre-determined identifier with the container, information pertaining to the type of content, e.g., images, video, blogs, documents, and the like, that will be stored in the container can also be embedded in the pre-determined identifier. In some implementations, each pre-determined identifier corresponding to each container can be provided to a user. The user can include the pre-determined identifier to an address of a message including attachments, in order to transmit the attachments using a mobile device for storage in the containers.

A message containing attachments can be received from a mobile device at 515, where the received message can include an identifier. The message can be scanned for an identifier and, in the absence of an identifier, the message can be disregarded since the destination for the message is unknown. An error message can be transmitted to the mobile device from which such a message is received. If the message includes an identifier, the identifier can be extracted from the message at 520. A check can be performed to determine if the extracted identifier matches a pre-determined identifier at 525. If the identifier matches a pre-determined identifier for any one of the previously created and enabled containers, then the mobile source from which the message was received can be deemed as a valid source at 530. If the identifier does not match a pre-determined identifier, then the message can be disregarded at 535 because the message is deemed to be received from an invalid source. In some implementations, an error message can be transmitted to the invalid mobile device that access to a container is not available.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, near-touch input, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, in some implementations, more than one user can access the same container in the content repository 205. When a user creates a container in the content repository 205, the MPE 105 creates a unique identifier corresponding to the container and provides the identifier to the user. The user can share the unique identifier with one or more other users. Each user can subsequently access the same container, where the user who created the container can be the owner of the container while other users can be members that have access to the container.

Figure 6:
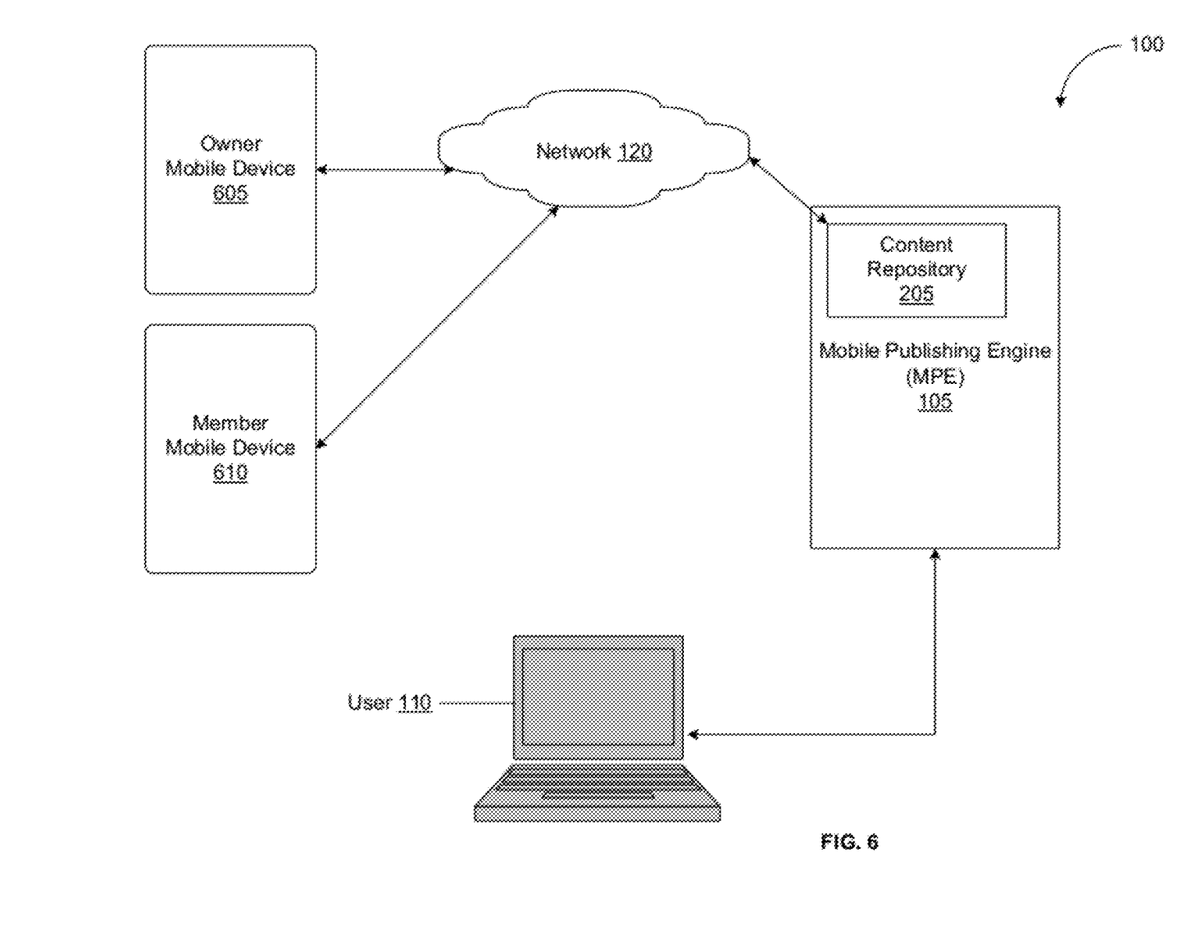
FIG. 6 shows an example of a system for receiving content from more than one mobile device.

FIG. 6 depicts a schematic of a system 100 where the content repository 205 in the MPE 105 is accessed by two mobile devices, an owner mobile device 605 and a member mobile device 610. The owner mobile device 605 can be controlled by the user who created the content repository 205 and the included containers. In addition, the owner mobile device 610 can be synchronized with the MPE 105. The member mobile device 610 can be controlled by the user who has received the unique identifier to enable access to a container in the content repository 205. Since the member mobile device 610 can access a container, a user of the member mobile device 610 can capture content, e.g., a digital image, create a message, e.g., e-mail message for transmission to the MPE 105, attach the content to the message, and transmit the message with the attachment to the MPE 105. The user of the member mobile device 610 inputs the unique identifier that enables access to the container in the message, e.g., in the header of the e-mail message. Upon receiving the message from the member mobile device 610, the MPE 105 can be configured to validate the source by comparing the unique identifier in the message with corresponding information in the identifier generator 210, where the information can include a list of mobile devices that are allowed to access the container in the content repository 205. On the other hand, the owner mobile device 605 generates the message for the user of the device 605, since the owner mobile device 605 is synchronized with the MPE 105 and the MPE 105 is configured to recognize that messages to a container from the synchronized mobile device 605 are valid. In some implementations, a list of member mobile devices 610 can be input to the MPE 105. The MPE 105 can be configured to transmit messages containing attachments from the valid member mobile devices 610 to the appropriate containers in the content repository 205 without requiring validation of the source of the messages. In addition, the member mobile devices 610 can also be configured such that, if the member mobile device 610 is on the list of accepted devices, then message generation on such devices 610 is similar to that on the owner mobile device 605.

In some implementations, the CIU 225 can be configured to receive all attachments to a message including the attachment received from the mobile device, identify the attachment received from the mobile device, and transmit the identified attachment to the content repository 205. In other implementations, the CIU 225 can be configured to identify all attachments that are not attachments received from the mobile device, separate the identified attachments from that received from the mobile device, and transmit the message, including only the attachment received from the mobile device to the content repository 205.

In some implementations, the MPE 105 can be divided into two layers, e.g., an application layer and a proxy layer. The proxy layer can be configured to perform the message receiving and validation. For example, the proxy layer can receive the message, identify the unique identifier, validate the identifier, and, upon detecting that the identifier is valid, transmit the entire message to the application layer. Subsequently, the application layer can separate the attachment received from the mobile device from the remainder of the message and transmit the attachment to the content repository 205. In such implementations, the proxy layer validation can be based only on the header of the received message. Application layer attachment separation can be based on the body of the message. In other implementations, the MPE 105 can contain only an application layer that can perform all operations including validation and attachment separation.

In some implementations, the unique identifier generated for each container in the content repository 205 can be configured to represent the type of content that will be stored in the container. For example, the MPE 105 can be configured to present the user with an option to select the type of content that will be stored in a container. Based on user input, the container can store images, video files, documents, blogs, or any combination of the same. The identifier generated by the identifier generator 210 in response to the user input can embed into the identifier, information that the MPE 105 can use to recognize the type of content in a message received from the mobile device 115. Such information embedded into the unique identifier can also be used as one of the factors to identify and separate the attachment from the message. Thus, if a message containing a video file attachment is received, the MPE 105 can route the message to the corresponding container by scanning the unique identifier. This can reduce the load on the MPE 105 in scanning the message, identifying the attachment, further identifying the type of attachment, and routing the identified attachment to the corresponding container.

In some implementations, when a message is received from a mobile device, the MPE 105 can be configured to disable access to the content repository 205 until the source of the message is validated. Once the source of the message is validated, the MPE 105 can enable access to the content repository 205 for storing the separated attachment in the corresponding container. In some implementations, the mobile device 115 can be configured to identify metadata related to the attachment such as type, size, name, and the like. The mobile device 115 can further be configured to include this information in the message to the MPE 105. The MPE 105 can be configured to scan the received message for the metadata attached to the message by the mobile device 115 and use the included metadata to identify and separate the attachment. Messages containing attachments for storage in the content repository 205 can be received from any source including computers such as laptop computers, desktop computers, PDAs, and the like, in addition to the mobile device 115. Each source can be operatively coupled to the MPE 105 and transmit the message containing attachments using the unique identifier corresponding to each container. Any user in possession of the unique identifier corresponding to a container can transmit a message including an attachment to the MPE 105 for storage in the content repository 205. In some implementations, the MPE 105 can include a white list of acceptable sources of messages, a black list of unacceptable sources of messages, or both, where the lists can be generated based on factors including user input, history of sources from which messages are received, known unacceptable sources of messages, and the like. For example, if several, e.g., more than 10, messages are received from the same source every day, the MPE 105 can be configured to either block the messages received from the source entirely or to limit the number of messages that will be submitted to the MRU 215.

In some implementations, the mobile device 115 or the MPE 105 or both can be configured to detect the size of the attachment, compare the size with a threshold size that can be transmitted by the mobile device 115 or processed by the MPE 105 or both, and can be configured to prompt the user 110 to either decrease the size of the attachment or inform the user 110 cannot be transmitted since the attachment is too large. In some implementations, when the user 110 configures the mobile device 115, the user 110 can access the MPE 105 with the mobile device 110. The mobile device 110 can be configured to transmit the user name and access password to enable accessing the user's account on the MPE 105. The MPE 105 can be configured to validate the user name and password and, subsequently, establish a secure connection that can negate the authentication requirement every time the mobile device 115 attempts to connect to the MPE 105.

Images in containers can be viewed on the UI 305 on the mobile device 115 as well as on any display device that is part of a computer that is operatively coupled to the MPE 105. In some implementations, the display device can be the screen of a desktop computer connected to the MPE 105 over the internet. The user can access the account using the URL for the network location and view the contents of the containers in the content repository 205 via a web browser, e.g., Safari.

For example, the user can log in to the account, access the content repository 205 and view the contents of the containers on the display device. As one or more captured images from one or more mobile devices are received as message attachments by the MPE 105, the MPE 105 can separate the attachments and upload the images on the network location for viewing. In some implementations, the remote network location where images are viewed can be configured to maintain a connection with the MPE 105, such that when a new image is received in the content repository 205, the connection prompts the web browser to refresh display to enable displaying the new image. In this manner, the user need not continuously refresh the browser to determine whether new images have been uploaded. In other implementations, the MPE 105 can periodically refresh the web browser in response to a period request received from the device to which the MPE 105 is operatively coupled.

In some implementations, the mobile device 115 can be configured to receive input from the user 110 that the user intends to capture a series of images, and that each image is to be transmitted to the MPE 105 for storage in the content repository 205. In such implementations, when a user 110 captures an image, the image is automatically transmitted to the MPE 105. The message generation, image attachment, and other functions required to transmit messages to the MPE 105 can remain transparent to the user. In some implementations, the mobile device 115 can be configured to allow a user to create and enable access to a container using the mobile device 115. If the user wishes to capture images at an event, but has forgotten to create and enable the container prior to the event, then the user can do so using the mobile device 115. In addition, the mobile device 115 can be configured to enable the user to view the content that is being uploaded to the container and restrict access to the container. In some implementations, the MPE 105 can create an identifier, e.g., a URL, for each object in each container as well as for each container. The MPE 105 can be configured to display the URL for each object on the UI 305 as well as the display device of any computer from which the contents of a container are accessed. The user can provide other users with the URL to enable other users to view and/or edit the content in the content repository 205, and, in addition, use the URLs to navigate the content repository 205 to access the objects in the containers.

In some implementations, the mobile device 115 can be configured to compress the captured image to a smaller size, e.g., a low resolution image, to facilitate transmission as a message. In addition, the mobile device 115 can include storage space in which the image can be stored in the full resolution. In this manner, a large size, e.g., 2 MB, image can be compressed and transmitted as a smaller size, e.g., 8 KB, file that can be easily transmitted over the network 120. Subsequently, when the mobile device 115 is connected to the MPE 105 over a network having high bandwidth, e.g., a high speed internet connection, the full resolution image can be transmitted to the MPE 105 and stored in the content repository 205. Accordingly, other embodiments are within the scope of the following claims.

What is claimed is:

1. A computer-implemented method comprising:
   receiving a plurality of objects from a mobile device over a wireless network, the
   plurality of objects including one or more content items captured using the mobile device and one or more information items inserted by a service provider;
   receiving, with the plurality of objects, a destination address that specifies a previously created repository for storing the one or more content items, wherein the repository includes a pre-determined identifier;

separating the one or more content items from the one or more information items, including:

identifying a first attribute shared by the one or more content items;

identifying a second attribute shared by the one or more information items, the second attribute being different from the first attribute;

determining, based on the first attribute, the second attribute, and a selection criterion, that the one or more content items were captured using the mobile device, and that the one or more information items were inserted by the service provider; and separating the one or more content items from the one or more information items upon the determining;

providing the one or more content items for storage in the repository; and disregarding the one or more information items.

2. The method of claim 1, further comprising:

creating the repository to store the one or more content items; and generating a pre-determined identifier in response to creating the repository.

3. The method of claim 2, further comprising providing the predetermined identifier to be associated with the plurality of objects.

4. The method of claim 1, wherein receiving the plurality of objects comprises receiving a message that includes the plurality of objects as attachments.

5. The method of claim 1, wherein determining that the one or more content items were captured using the mobile device, and that the one or more information items were inserted by the service provider comprises:

determining that a size of each content item satisfies a threshold size, and a size of each information item does not satisfy the threshold size; and determining that a number of the one or more information items satisfies a pre-identified number of attachments of the service provider or the attribute of the one or more information items satisfies a pre-identified pattern of attachments of the service provider.

6. The method of claim 1, wherein:

separating the one or more content items from the one or more information items comprises determining metadata from each content item and each information item, wherein the metadata includes at least one of an item size, an item name, or an item type, and the selection criterion includes at least a threshold size; and determining that the one or more content items were captured using the mobile device comprises determining that the item size of each content item is larger than the threshold size.

7. The method of claim 1 further comprising:

storing the separated one or more content items in the repository; and generating a uniform resource locator (URL) to identify the repository, wherein the URL enables accessing the repository from a remote network location remote from the repository.

8. A non-transitory computer-readable medium storing instructions to cause data processing apparatus to perform operations comprising:

receiving an electronic message from a mobile device over a wireless network, the message including:

a source address from which the message is received, one or more attachments corresponding to content items captured using the mobile device, one or more information items inserted into the message by a service provider, and a destination address that specifies a previously created repository connected to the mobile device over the wireless network for storing the one or more attachments, wherein the repository includes a pre-determined identifier;

separating the one or more attachments from the one or more information items, including:

identifying a first attribute shared by the one or more content items, identifying a second attribute shared by the information items, the second attribute being different from the first attribute, determining, based on the first attribute, the second attribute, and a selection criterion, that the one or more content items were captured using the mobile device, and that the one or more information items were inserted by the service provider, and separating the one or more content items from the one or more information items upon the determining;

providing the one or more attachments for storage in the repository; and disregarding the one or more information items.

9. The medium of claim 8, further comprising validating the mobile device as an acceptable source from which to receive the electronic message based on the received source address matching a previously approved source address, wherein validating the mobile device as an acceptable source comprises:

extracting an identifier from the source address;

comparing the extracted identifier with the pre-determined identifier;

determining that the extracted identifier matches the pre-determined identifier; and designating, in response to the determining, the source address as being a previously approved source address.

10. The medium of claim 9, the operations further comprising:

generating the pre-determined identifier in response to creating the repository; and providing the pre-determined identifier for inclusion in messages directed to the repository.

11. The medium of claim 9, wherein the destination address includes an identity of an entity authorized to access the repository and an identity previously associated with the repository.

12. The medium of claim 8, wherein each of the one or more content items and each of the one or more information items has a same file type.

13. The medium of claim 9, wherein comparing the extracted identifier with the pre-determined identifier comprises:

retrieving multiple pre-determined identifiers, each of the multiple pre-determined identifiers being associated with a previously approved source address; and comparing the extracted identifier against the retrieved multiple pre-determined identifiers.

14. The medium of claim 8, wherein separating the one or more attachments from the one or more information items comprises separating based at least in part on at least one of a file extension of an attachment or a size of an attachment or a total number of attachments included in the message.

15. A system comprising:

one or more data processing apparatus; and a non-transitory computer-readable medium storing instructions executable by the one or more data processing apparatus to perform operations comprising:

receiving a plurality of objects from a mobile device over a wireless network, the plurality of objects including one or more content items corresponding to content items captured using the mobile device and one or more information items inserted by a service provider;

receiving, with the plurality of objects, a destination address that specifies a previously created repository for storing the one or more content items, wherein the repository includes a pre-determined identifier; and separating the one or more content items from one or more information items, including:

identifying a first attribute shared by the one or more content items, identifying a second attribute shared by the information items, the second attribute being different from the first attribute, determining, based on the first attribute, the second attribute, and a selection criterion, that the one or more content items were captured using the mobile device, and that the one or more information items were inserted by the service provider, separating the one or more content items from the one or more information items upon the determining, providing the one or more content items for storage in the repository, and disregarding the one or more information items.

16. The system of claim 15, further comprising:

creating the repository to store the one or more content items; and generating a pre-determined identifier in response to creating the repository.

17. The system of claim 16, further comprising providing the predetermined identifier to be associated with the one or more content items.

18. The system of claim 15, wherein receiving the plurality of objects comprises receiving a message that includes the plurality of objects as attachments.

19. The system of claim 15, wherein determining that the one or more content items were captured using the mobile device, and that the one or more information items were inserted by the service provider comprises:

determining that a size of each content item satisfies a threshold size, and a size of each information item does not satisfy the threshold size;

determining that a number of the one or more information items satisfies a pre-identified number of attachments of the service provider or the attribute of the one or more information items satisfies a pre-identified pattern of attachments of the service provider.

20. The system of claim 15, wherein separating the one or more content items from the one or more information items comprises:

determining metadata from each content item and each information item, wherein the metadata includes at least one of an item size, an item name, or an item type, and the selection criterion includes at least a threshold size; and determining that the metadata satisfies the selection criterion comprises determining that the item size of each content item is larger than the threshold size.

* * * * *